United States Patent [19]

Skalka et al.

[11] Patent Number: 4,687,167
[45] Date of Patent: Aug. 18, 1987

[54] MULTI-POSITION COMPUTER SUPPORT

[76] Inventors: Gerald P. Skalka, 5027 Cathedral Ave., NW., Washington, D.C. 20016; Stanley H. Skalka, 9015 Mistwood Dr., Potomac, Md. 20854

[21] Appl. No.: 790,487

[22] Filed: Oct. 23, 1985

[51] Int. Cl.⁴ .............................................. E04G 3/00
[52] U.S. Cl. .................................... 248/282; 248/425; 248/411; 248/183; 403/87; 384/276; 108/103; 108/142
[58] Field of Search .............. 248/282, 283, 284, 183, 248/424, 425, 411; 108/92, 93, 94, 102, 103, 139, 140, 142; 211/95, 96; 308/244; 384/226, 244, 271, 276, 424; 403/87, 162, 163, 84

[56] References Cited

U.S. PATENT DOCUMENTS

| | | | |
|---|---|---|---|
| 221,800 | 11/1879 | Eversole | 108/140 |
| 320,941 | 6/1885 | Macomber | 248/283 |
| 914,047 | 3/1909 | Holcomb | 108/140 |
| 999,283 | 8/1911 | White | 248/282 |
| 1,220,578 | 3/1917 | Wise | 108/139 |
| 1,247,112 | 11/1917 | Holmberg | 108/139 |
| 1,275,602 | 8/1918 | Remo | 108/139 |
| 1,894,991 | 1/1933 | Hayes | 108/140 |
| 3,550,892 | 12/1970 | Propst | 248/282 |
| 4,085,961 | 4/1978 | Brown | 248/282 |
| 4,181,281 | 1/1980 | Kosak | 108/140 |
| 4,307,672 | 12/1981 | Shikimi | 248/282 |
| 4,310,136 | 1/1982 | Mooney | 248/183 |
| 4,365,561 | 12/1982 | Tellier | 248/1 F |
| 4,437,638 | 3/1984 | Schelbenpflug | 248/282 |
| 4,447,031 | 5/1984 | Souder | 248/1 F |
| 4,487,389 | 12/1984 | Ziegler | 248/282 |
| 4,516,751 | 7/1985 | Westbrook | 248/181 |
| 4,526,336 | 7/1985 | Durivault | 248/183 |
| 4,546,708 | 10/1985 | Wilburth | 248/282 |
| 4,562,987 | 1/1986 | Leeds | 248/283 |
| 4,567,835 | 2/1986 | Reese et al. | 108/102 |

FOREIGN PATENT DOCUMENTS

| | | | |
|---|---|---|---|
| 2214424 | 3/1972 | Fed. Rep. of Germany | 108/140 |
| 2360616 | 6/1975 | Fed. Rep. of Germany | 248/282 |
| 645705 | 10/1928 | France | 108/139 |
| 1406564 | 6/1965 | France | 248/282 |
| 92073 | 4/1938 | Sweden | 248/283 |

OTHER PUBLICATIONS

Global Publication, Catalog P33, p. 2, copyright 1983, "The CRT Shuttle".
Global Publication, Catalog C52, pp. 12–13, "CRT Shuttle".
Devoke Data Products, Summer/Fall 85 Catalog, Section 31, "CRT Valet".

*Primary Examiner*—Cornelius J. Husar
*Assistant Examiner*—Eric K. Nicholson
*Attorney, Agent, or Firm*—Mason, Fenwick & Lawrence

[57] ABSTRACT

A computer support includes a base member to which an inner swing arm is pivotally mounted with an outer swing arm being pivotally mounted on the outer end of the inner swing arm and supporting a platform support by a lazy-susan bearing on its outer end. The pivotal connections are provided by pivot shafts over which pivot sleeves are positioned with upper and lower spaced roller bearing sets therebetween and a low-friction load bearing sleeve of substantial hardness engaging the lower end of each pivot sleeve to support same. Brake/lock means at each pivot permits retention of the arms in any desired rotational position in separate horizontal planes of movement.

17 Claims, 9 Drawing Figures

4,687,167

MULTI-POSITION COMPUTER SUPPORT

BACKGROUND OF THE INVENTION

The present invention is in the field of manually positionable supports and is specifically directed to a manually postionable support means having particular adaptability for supporting a computer and its associated monitor.

It is frequently desirable to position a computer and its associated monitor in a variety of positions to permit multiple users to use the computer or to provide adequate work space for other materials. Consequently, a number of devices have been proposed for this purpose. Such devices include desk-mounted attachment means to which an inner pivot arm is mounted with an outer pivot arm being mounted on the outer end of the pivot arm and supporting a work support platform at its outer end. Such systems have suffered from a number of shortcomings, including lack of adequate strength, high friction pivot couplings between the pivot arms and between the inner pivot arm and its supporting structure, high expense and an inability to easily and accurately position the computer or other items supported on the outer end of the outer pivot arm. Other devices have employed parallelogram type linkages and/or complicated arrangements for supporting a work station platform. It should also be noted that the prior art contains a large number of older patents which were used for supporting a wide variety of items long before computers were invented. Examples of the prior art include U.S. Pat. Nos. 221,800; 818,982; 914,047; 999,283; 1,220,578; 1,247,112; 1,275,602; 1,696,518; 3,550,892; 4,085,961 and 4,307,672. Prior art patents specifically directed to apparatus for supporting computers or monitors include U.S. Pat. Nos. 4,437,638 and 4,487,389.

Unfortunately, the prior art devices all suffer from one or more of the drawbacks of being difficult to position, overly complicated, expensive, lack of strength adequate to permit supporting heavy items such as computers, lack of versatility and being incapable of providing support for the supported item in a wide variety of positions.

Therefore, it is a primary object of the present invention to provide a new and improved support device for computers and similar equipment.

A further object of the present invention is a provision of a new and improved computer support having high strength, ease of positioning of the supported computer over a large area and economy of construction and maintenance.

SUMMARY OF THE INVENTION

Achievement of the foregoing objects is enabled by the preferred embodiment of the invention through the provision of a unique low-friction support system including axially spaced plural roller bearing sets provided for pivot arm support and juncture connections and including braking/locking means for holding the supported computer in a desired position. More specifically, a support base includes a base plate which is attached to the upper surface of a desk, table or the like and has a vertically extending pivot shaft extending upwardly therefrom. A hardened low-friction bearing sleeve fits over the pivot shaft and rests on the upper surface of the base means. An inner or first swing arm of hollow rectangular transverse cross-section is welded at its inner end to a pivot sleeve having an internal bore of greater diameter than the diameter of the pivot shaft. An upper roller bearing set is provided in the upper end of the bore of the pivot sleeve and a lower roller bearing set is provided adjacent the lower end thereof with the upper and lower bearings sets being dimensioned to engage the outer polished surface of the pivot rod to permit an easy swinging movement of the first swing arm about the axis thereof. However, the lower end of the pivot sleeve rests on the low-friction support bearing which serves to support a substantial portion of the weight of the assembly carried by the first swing arm. A threaded aperture is provided in the pivot sleeve and supports a threaded rod having a knob at its outer end which is adjustable to bring its inner end into contact with the pivot shaft to walk the first swing arm in any desired position or to simply create sufficient friction as to permit the swing arm to be moved to a desired position in which it will then remain.

The outer end of the first swing arm is provided with a vertically extending movable outer pivot shaft on which a second or outer swing arm of hollow rectangular transverse cross-section is mounted by means of an outer pivot sleeve which is basically identical to the first or inner pivot sleeve. Additionally, a braking/locking knob is also provided on the outer pivot sleeve in a manner essentially identical to the similar means on the inner pivot sleeve. A lazy-susan bearing assembly is attached to a support plate assembly affixed to the outer end of the second swing arm and the upper surface of the aforementioned bearing assembly provides support for a wooden support platform of adequate dimensions to support a computer and its associated monitor or the like. The support platform has a pair of forwardly extending handle support members to the outer ends of which a wooden handle is connected forwardly of the front edge of the support platform to enable an easy positioning of the support platform.

Alternative embodiments include the mounting of the inner or fixed pivot shaft on a wall bracket or on a clamp bracket attachable to the edge of a table. Additionally, a further embodiment does not use the outer swing arm and the lazy-susan bearing assembly is instead attached to the upper surface of the outer end of the first swing arm.

A better understanding of the construction and operation of the aforementioned embodiments of the invention will be achieved when the following detailed description is considered in conjunction with the appended drawings in which like reference numerals are used for the same parts as illustrated in the different drawing figures.

DESCRIPTION OF THE PREFERRED EMBODIMENTS

Figure 1:
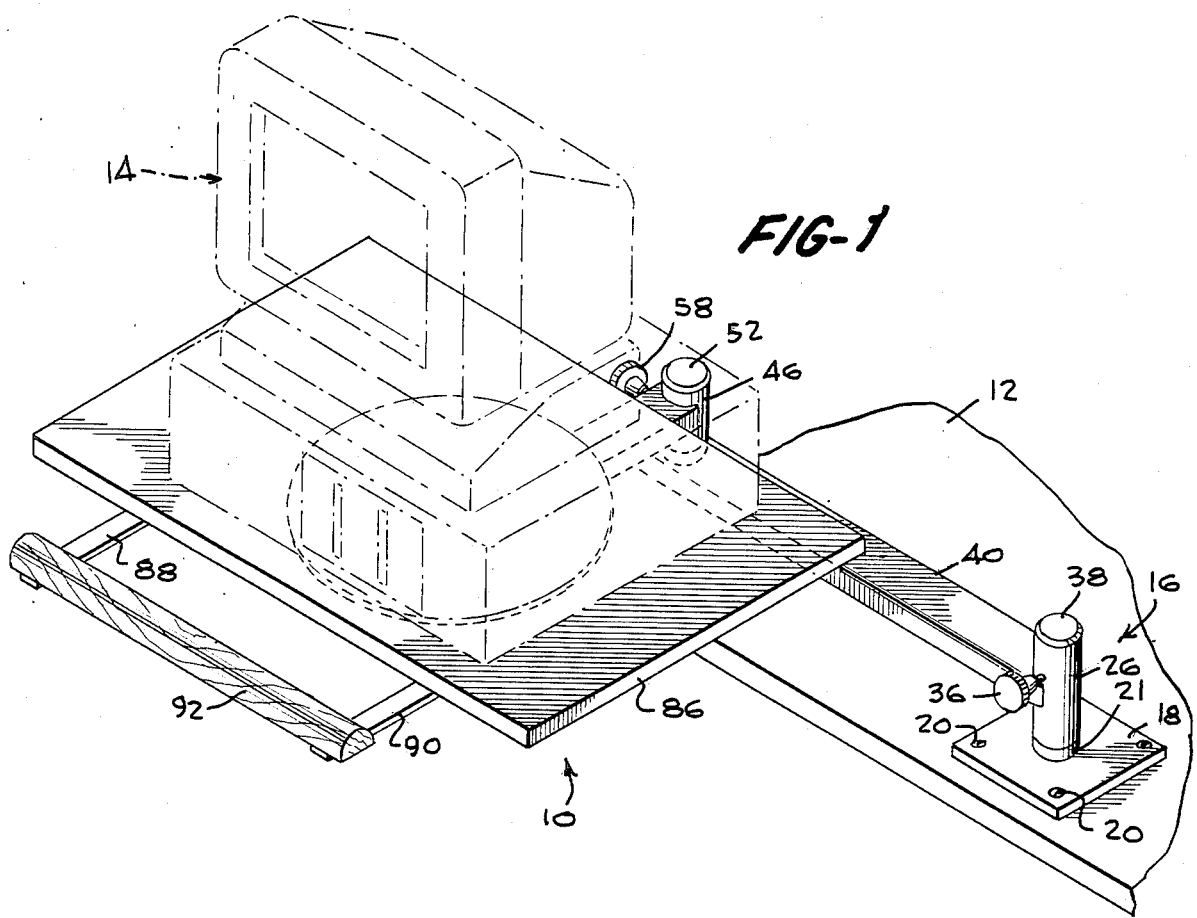
FIG. 1 is a perspective view of the preferred embodiment of the invention.
Figure 3:
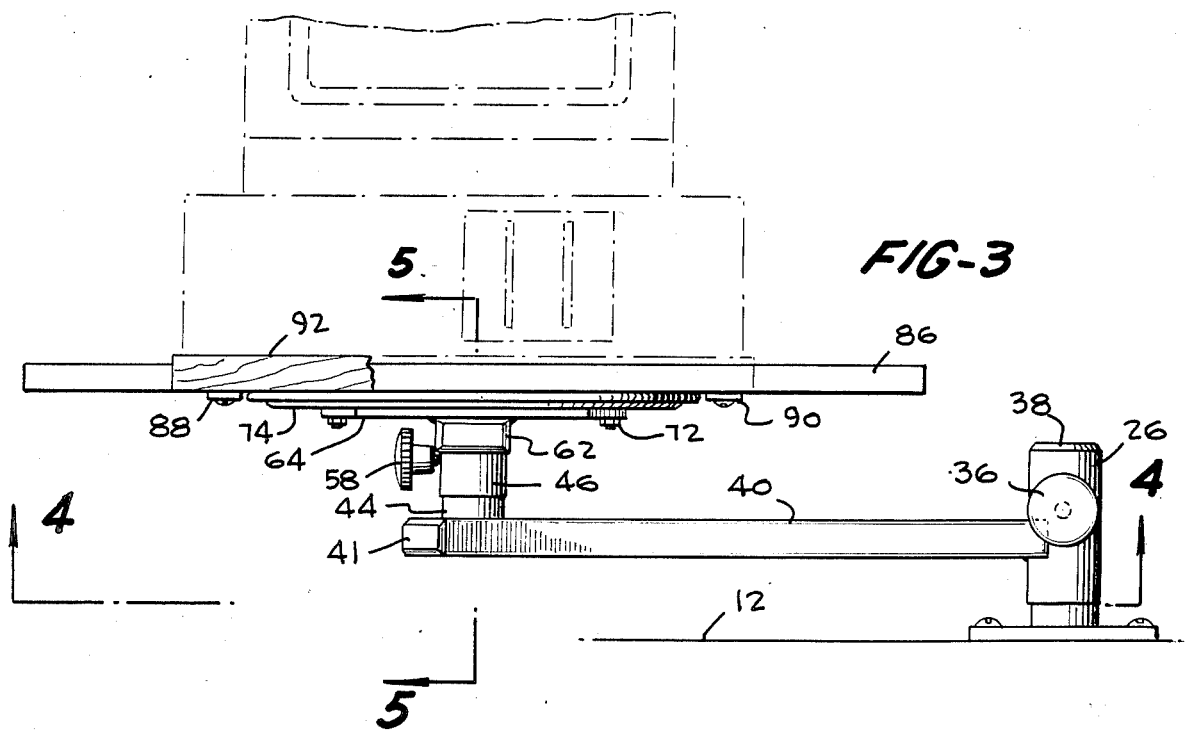
FIG. 3 is a side elevation of the preferred embodiment.
Figure 2:
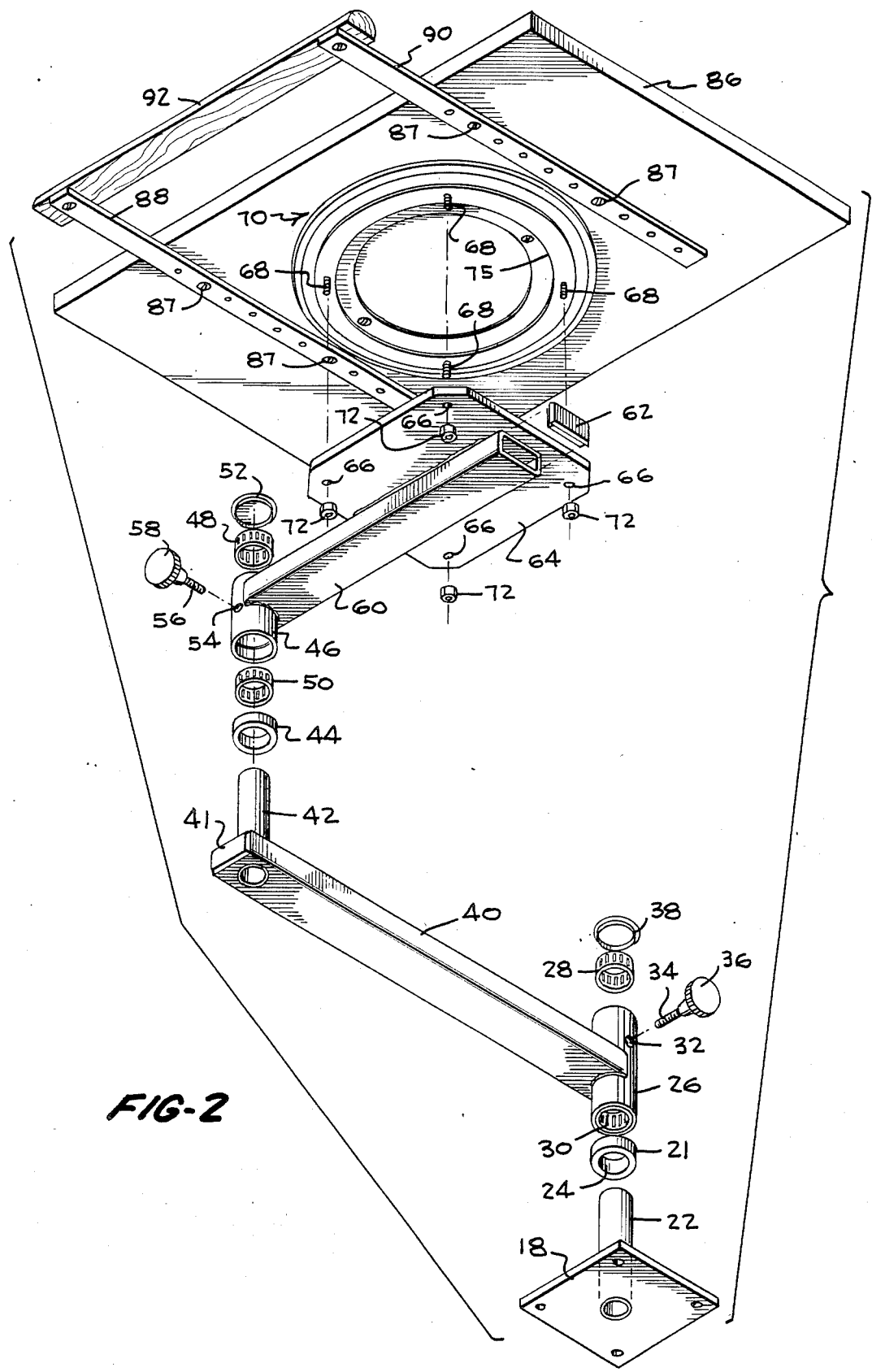
FIG. 2 is an exploded perspective of the preferred embodiment as viewed from a position below and forwardly thereof.
Figure 4:
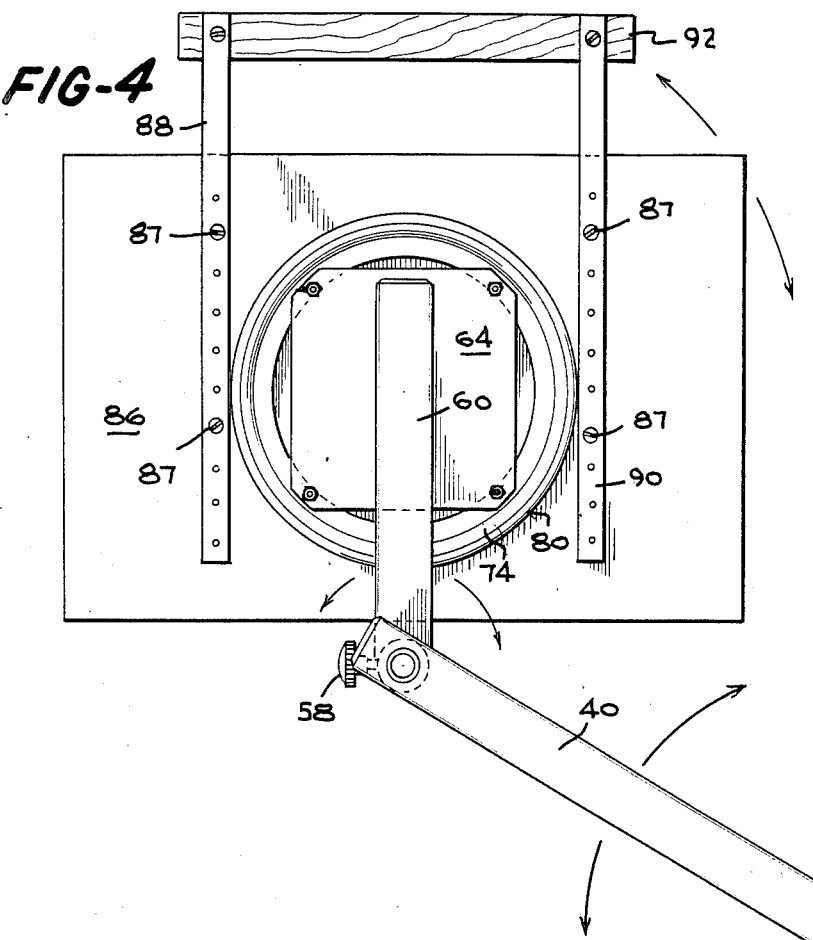
FIG. 4 is a sectional view taken along lines 4—4 of FIG. 3.
Figure 5:
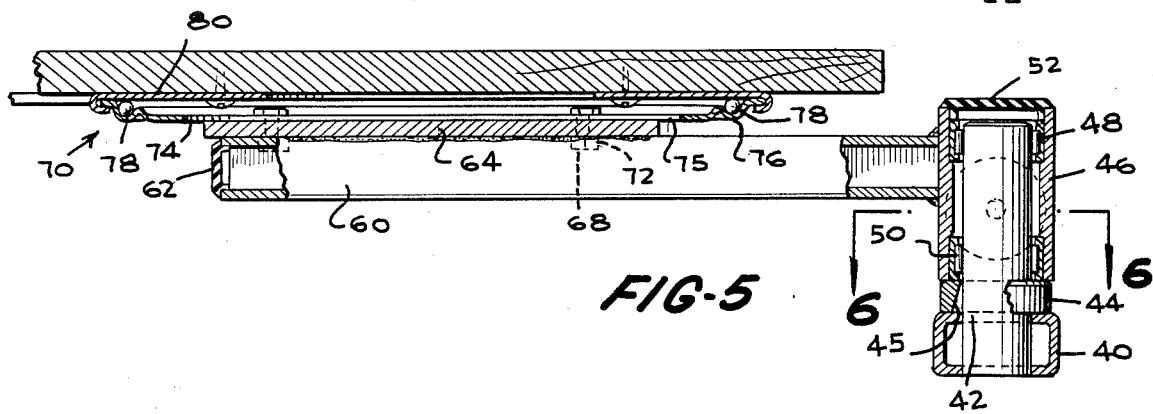
FIG. 5 is a sectional view taken along lines 5—5 of FIG. 3.
Figure 6:
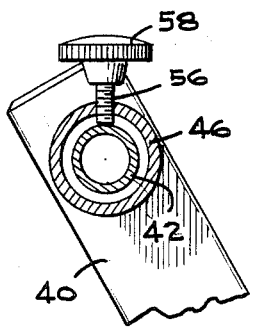
FIG. 6 is a sectional view taken along lines 6—6 of FIG. 5.

Attention is initially invited to FIG. 1 of the drawings which illustrates the preferred embodiment of the invention, generally designated 10, mounted on a table or desk top 12 (or other horizonal stationary support) and providing support for a computer and associated monitor generally designated 14 and illustrated in phantom lines.

Attachment of the first embodiment to support 12 is enabled by fixedly positioned base means 16 which includes a base plate 18 attached to the table or desk top 12 by bolt means 20 extending therethrough and a vertically extending fixed or inner pivot shaft 22 mounted in a central aperture in base plate 18 and welded thereto at the upper surface of base plate 18 and at the lower surface to provide a strong and rigid connection between the pivot shaft and the base plate.

A tubular sleeve bearing 21 formed of hardened low-friction steel has an inner opening defined by a conical surface 24 with the larger diameter portion thereof being at the lower end of the sleeve bearing 21 which is fitted over pivot shaft 22 so that the larger diameter portion provides adequate space to accommodate the welding bead at the juncture of the upper surface of plate 18 and pivot shaft 22. The lower surface of tubular sleeve bearing 21 rests on the upper surface of base plate 18 and its upper surface engages the lower end of a first or inner pivot sleeve 26 which has an upper roller bearing set 28 and a lower roller bearing set 30 provided in its interior.

It should be noted that each bearing set consists of a plurality of roller bearings and a retainer with the roller bearings engaging the outer polished surface of the fixed or inner pivot shaft 22 to permit a low-friction rotation of the first or inner pivot sleeve 26 about the axis thereof. A threaded aperture 32 extends through the wall of inner pivot sleeve 26 and receives a threaded break/lock screw 34 to the outer end of which a knob 36 is attached. Rotation of knob 36 results in the end of the brake/lock screw 34 engaging the outer surface of inner pivot shaft 22 to provide a desired amount of friction in resistance to pivotal movement of pivot sleeve 26 about the axis of pivot 22 here the amount of friction can be varied and can be sufficient to simply lock the pivot sleeve 26 in position if desired. The upper end of the first or inner pivot sleeve 26 is covered with a plastic cap or plug 38.

A first or inner swing arm 40 of hollow rectangular transverse cross-section has its inner end welded to the first or inner pivot sleeve 26 and extends outwardly in perpendicular manner therefrom at a location approximately midway between the upper end and lower end of the pivot sleeve 26. An outer or second pivot shaft 42 extends vertically upward from the outer end of swing arm 40 through which it extends and to which it is welded in a manner analogous to the connection of inner pivot shaft 22 to the base plate 18.

A tubular sleeve bearing 44 identical to tubular sleeve 21 is fitted over the outer or second pivot shaft 42 to cover a weld bead 45 and a second or outer pivot sleeve 46 identical to the first or inner pivot sleeve 26 is fitted over the second pivot shaft 42. Upper roller bearing set 48 and lower roller bearing set 50 are provided on the interior of the outer pivot sleeve 46 to engage the outer surface of pivot shaft 42 in exactly the same manner that bearings 28 and 30 engage the outer surface of the pivot shaft 22. A plastic cap or plug 52 is received in the upper end of the second pivot sleeve 46. Also, sleeve 46 is provided with a threaded aperture 54 receiving a brake/lock screw 56 having a knob 58 on its outer end and being identical in construction, purpose and operation to elements 34, 36 associated with the inner pivot sleeve 26. It should be observed that the inner end of the brake/lock members 34 and 56 can be provided with a friction enhancing pad or the like or engaging the outer surface of the associated pivot shafts or metal to metal contact can be employed if desired.

A second or outer swing arm 60 is welded to the second or outer pivot sleeve 46 and extends outwardly therefrom in a perpendicular manner. Swing arm 60 is identical in cross-section to the inner swing arm 40 but is of reduced length as compared thereto. Additionally, a plastic end cap or plug 62 is provided in the outer end of the outer swing arm 60 and a single similar plastic end cap or plug 41 is provided in the outer end of the inner swing arm 40. A metal carrier plate 64 is welded to the upper surface of the outer swing arm 60 and is provided with four openings 66 through which mounting bolts 68 extend.

A lazy-susan bearing assembly, generally designated 70 is attached to the metal carrier plate 64 by bolts 68 which are held in position by nuts 72. The lazy-susan bearing assembly comprises a fixed annular bottom tray 74 having an inner edge 75 and a coaxial annular bearing groove 76 in which spherical roller bearings 78 are positioned to support an upper or top tray 80 for rotation in a well known manner. Additionally, upwardly extending dimples 82 are provided at equal angular spacings about the axis of the fixed circular bottom tray 74 to engage a plastic detent 84 having a recess engageable with the dimples 82 to permit angular rotational positioning of the upper tray 80 in an obvious manner.

A wooden support platform 86 is attached to the upper or top tray 80 by screws or the like 87. First and second handle support plates 88 and 90 are connected to the lower surface of the wooden support platform 86 by screw means 87 and extend forwardly thereof. It should be observed that the handle support plates 88 and 90 are provided with a plurality of apertures to permit their positioning forwardly and rearly with respect to the wooden support platform in a desired position. A wooden handle 92 is connected to the outer ends of the support plates 88 and 90.

In operation, manual movement of wooden handle 92 and effects positioning of the computer 14 in any desired position. Break/lock means 34, 56 can be adjusted to lock the computer in such a position if desired and can also be adjusted to hold the computer in position with sufficient frictional force while still permitting subsequent manual adjustment of the computer position with a minimal effort.

Figure 7:
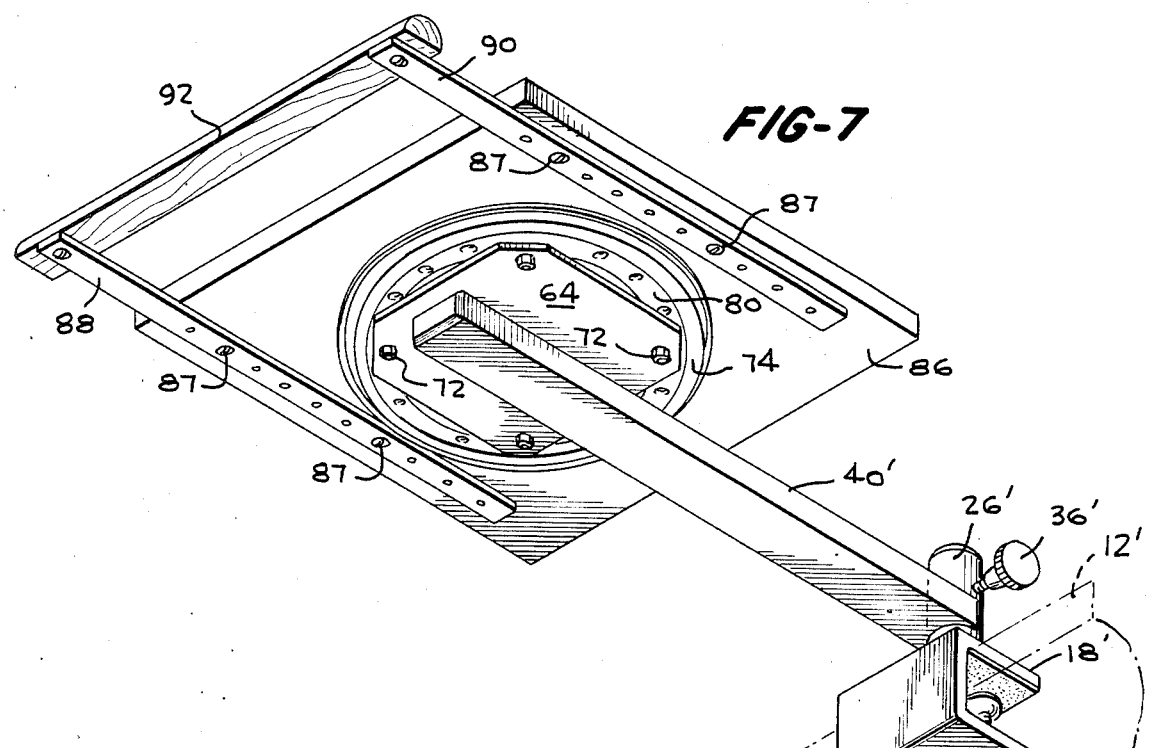
FIG. 7 is a perspective view of a second embodiment as viewed from a position below and forwardly thereof.

FIG. 7 illustrates a second embodiment in which the second swing arm 60 is not employed and the carrier plate 64 is directly affixed to the outer end of a modified swing arm 40'. The inner end of swing arm 40' is welded to a sleeve 26' fitted over a pivot shaft identical to pivot shaft 22 but attached to a base plate 18' that is unitarily part of a clamp assembly mounted on the edge 12' of a table or the like. Knob 36' is mounted in the pivot sleeve 26' and the members 26', 36' and the pivot shaft etc., on which they are mounted are simlarly associated with a bearing sleeve 21' identical to bearing sleeve 21. It should be noted that the carrier plate 64, etc., on the outer end of arm 40' is identical to the previously discussed carrier plate and wooden support platform 86 etc.

Figure 8:
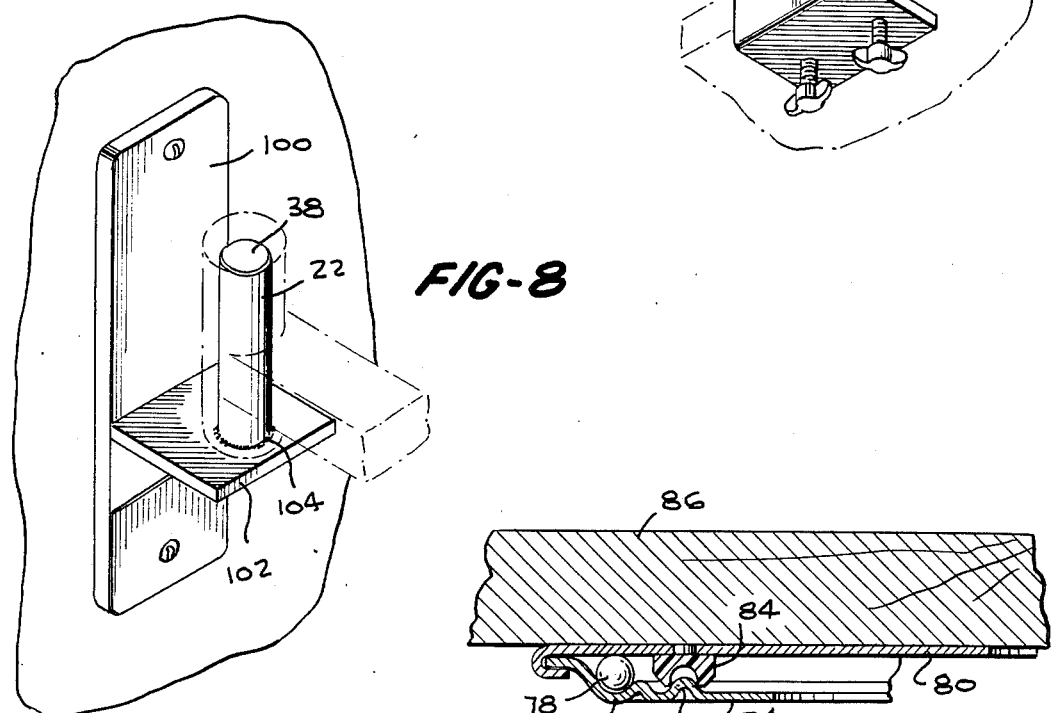
FIG. 8 is a perspective view of an alternative base pivot support means.
Figure 9:
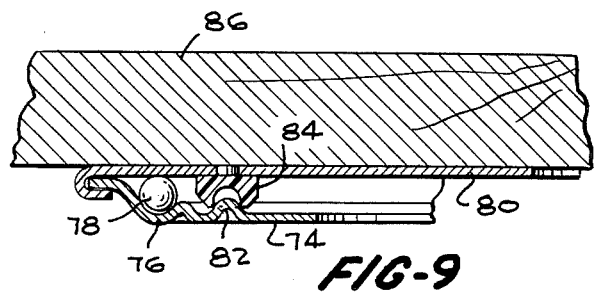
FIG. 9 is a sectional view illustrating detent means employable in the lazy-susan bearing arrangement.

FIG. 8 illustrates a third embodiment in which the inner pivot shaft 22 is mounted on a wall bracket 100 by a weld bead 104 on; a lateral horizonal extension 102 as shown. The embodiment of FIG. 1 or the embodiment of FIG. 7 can be mounted on the pin 22 as desired.

Thus, it will be seen that the disclosed embodiments provide a rugged and easily adjustable support system due to several factors. For example, the spacing between the upper and lower roller bearing sets provides substantial resistance to twisting deflection caused by the weight of the computer etc., while still permitting an easy rotation that is much easier than would be the case with a rod and sleeve bearing surface not employing roller bearings. The bearing members 21 and 40 also reduce friction and serve to support the downward vertical force caused by the weight of the assembly to preclude overloading of the roller bearings. The brake/lock means 34, 56 and the lazy-susan bearing assembly 70 present an easy positioning of the supported computer while permitting a easy subsequent movement to another desired position.

Numerous modifications of the disclosed embodiments will undoubtedly occur to those skilled in the art and it should be understood that the spirit and scope of the invention is to be limited solely by the appended claims.

I claim:

1. A cantilever support system for supporting a supported item for movement in a horizontal plane above a fixed surface comprising:
   base means fixed to said fixed surface and including a first vertical pivot shaft extending upwardly from attachment means on the fixed surface;
   first swing arm means including an outer end and an inner end mounted on said base means and including a first vertical pivot sleeve on its inner end fitted over said vertical pivot shaft and engageable therewith by first roller bearing means comprising an upper roller bearing set in the upper end of said first vertical pivot sleeve and a lower roller bearing set spaced substantial distance below said upper bearing set in the lower end of said first vertical pivot sleeve, and further including second vertical pivot shaft means extending upwardly from said outer end of said first swing arm means;
   second swing arm means having an outer end and an inner end, said inner end being pivotally mounted on the outer end of the first swing arm means by a second pivot sleeve and second roller bearing means therebetween;
   carrier plate means mounted on the outer end of said second swing arm means;
   rotary bearing means attached to and supported by carrier plate means;
   support platform means supported by said rotary bearing means to provide a movable support for any item positioned on said support platform means; and
   wherein said base means additionally includes a first tubular sleeve bearing fitted over said first vertical pivot shaft and positioned beneath and supportingly engaging the lower end of said first vertical pivot sleeve and additionally including a second tubular sleeve bearing fitted over said second vertical pivot shaft and positioned beneath and supportingly engaging the lower end of said second pivot sleeve.

2. The system of claim 1 additionally including first brake/locking means for permitting said first swing arm means to be locked in any desired position of rotation about said first vertical pivot shaft.

3. The system of claim 2 additionally including second brake/locking means for permitting said second swing arm means to be locked in any desired position of rotation about said second vertical pivot shaft.

4. The system of claim 3 additionally including detent means in said rotary bearing means for permitting selective rotational positioning of said support platform means in any one of a plurality of rotational positions about the rotational axis of said rotary bearing means.

5. The system of claim 4 additionally including manually engageable manipulating handle means connected to said support platform and positioned forwardly thereof.

6. A cantilever support system for supporting a supported item for movement in a horizontal plane above a fixed surface comprising:
   base means fixed to said fixed surface and including a first vertical pivot shaft extending upwardly from attachment means on the fixed surface;
   first swing arm means including an outer end and an inner end mounted on said base means and including a first vertical pivot sleeve on its inner end fitted over said vertical pivot shaft and engageable therewith by first roller bearing means therebetween and further including second vertical pivot shaft means extending upwardly from said outer of said first swing arm means;
   second swing arm means having an outer end and an inner end, said inner end being pivotally mounted on the outer end of the first swing arm means by a second pivot sleeve and second roller bearing means therebetween;
   carrier plate means mounted on the outer end of said second plate means;
   rotary bearing means attached to and supported by carrier plate means;
   support platform means supported by said rotary bearing means to provide a movable support for any item positioned on said support platform means;
   wherein said base means additionally includes a first tubular sleeve bearing fitted over said first vertical pivot shaft and positioned beneath and supportingly engaging the lower end of said first pivot sleeve; and said first tubular sleeve bearing has a conical interior surface fitted over said first vertical pivot shaft and said conical interior surface has its largest diameter portion at its lower end.

7. The system of claim 6 wherein said first swing arm additionally comprises a hollow metal beam of quadri-lateral transverse cross-section and having an inner end welded to said first pivot sleeve at a location approximately midway between the upper and lower ends of said first pivot sleeve.

8. The system of claim 7 wherein said second swing arm additionally comprises a hollow metal beam of quadri-lateral transverse cross-section and having an inner end welded to said second pivot sleeve at a location between the upper and lower ends thereof.

9. The system of claim 7 wherein said first roller bearing means comprises a first roller bearing set mounted in the upper end of said first vertical pivot sleeve and a second roller bearing set mounted in the lower end of said first vertical pivot sleeve.

10. The system of claim 9 wherein said second roller bearing means comprises an upper roller bearing set mounted in the upper end of said second pivot sleeve and a lower roller bearing set mounted in the lower end of said second pivot sleeve.

11. The system of claim 10 additionally including a second tubular sleeve bearing fitted over said second vertical pivot shaft and positioned beneath and supportingly engaging the lower end of said second pivot sleeve.

12. The system of claim 11 additionally including first locking means for permitting said first swing arm to be locked in any desired position of rotation about the axis of said first vertical pivot shaft.

13. The system of claim 12 additionally including second brake/locking means for permitting said second swing arm to be locked in any desired position of rotation about the axis of said second vertical pivot shaft.

14. The system of claim 13 additionally including detent means in said rotary bearing means for permitting selective rotational positioning of said support platform means in any one of a plurality of positions about the rotational axis of said rotary bearing means.

15. A cantilever support system for supporting a supported item for selected positioning in a horizontal plane comprising:

fixedly positioned base means including a first vertical pivot shaft extending upwardly from said base means;

swing arm means having an inner end and an outer end and mounted on said base means by a first vertical pivot sleeve on its inner end fitted over said first vertical pivot shaft and upper and lower roller bearing sets respectively mounted in upper and lower ends of said first vertical pivot sleeve;

means supporting rotary bearing means on the outer end of said swing arm means for rotational positioning about a vertical axis extending through the outer end of said swing arm means;

support platform means supported by said rotary bearing means to provide a movable support for any item positioned on said support platform means; and a bearing sleeve fitted over said vertical pivot shaft and positioned beneath said pivot sleeve in a supporting manner, said bearing sleeve having a conical opening on its interior with its larger end being its lower end and being fitted over said vertical pivot shaft so as to provide clearance for a welding bead employed in securing said vertical pivot shaft to said base means.

16. The system of claim 15 additionally including selectively operable locking means for locking said swing arm in a desired position of rotation relative to the axis of said vertical pivot shaft.

17. The system of claim 16 wherein said swing arm is of rectangular transverse cross-section and is of hollow metal construction with its longest transverse dimension being in a horizontal plane.

* * * * *